United States Patent [19]
Sakai et al.

[11] 3,856,884
[45] Dec. 24, 1974

[54] AN AROMATIC POLYCARBONATE/POLYALKYLENE NAPHTHALATE RESIN COMPOSITION HAVING A MARBLE-LIKE APPEARANCE

[75] Inventors: Kouichi Sakai; Yoshiaki Tokai; Sadayoshi Matsunaka, all of Sagamihara, Japan

[73] Assignee: Teijin Limited, Osaka, Japan

[22] Filed: July 31, 1973

[21] Appl. No.: 384,263

[52] U.S. Cl. ............................................... 260/860
[51] Int. Cl. .......................................... C08g 39/10
[58] Field of Search ............. 260/860, 47 XA, 75 R

[56] References Cited
UNITED STATES PATENTS
3,218,372  11/1965  Okamura et al. .................... 260/860
3,426,100   2/1969  McDonough ....................... 260/860

*Primary Examiner*—Melvin Goldstein
*Assistant Examiner*—T. Pertilla
*Attorney, Agent, or Firm*—Sherman & Shalloway

[57] ABSTRACT

A resin composition having a marble-like appearance is disclosed, comprising 5 to 90% by weight, based on the weight of the composition, of an aromatic polycarbonate, and a polyalkylene naphthalate consisting of polytetramethylene-2,6-naphthalate, polyhexamethylene-2,6-naphthalate and a mixture thereof.

8 Claims, 1 Drawing Figure

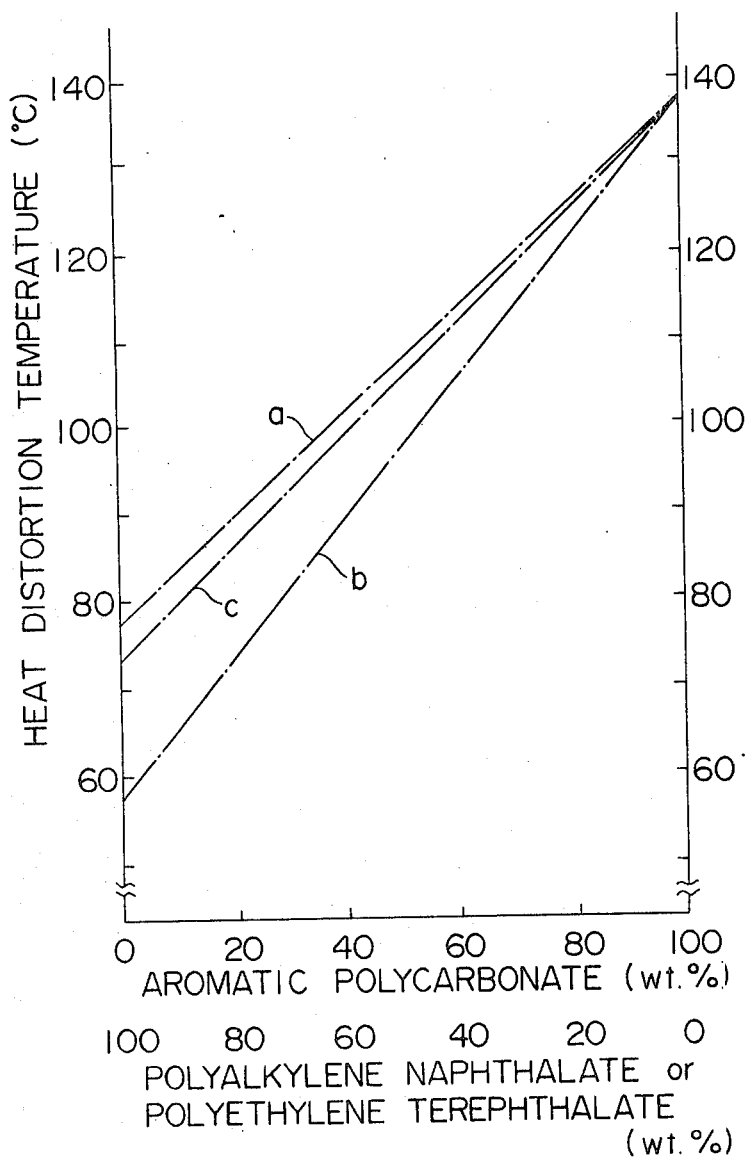

AROMATIC POLYCARBONATE/POLYALKYLENE NAPHTHALATE RESIN COMPOSITION HAVING A MARBLE-LIKE APPEARANCE

This invention relates to a polyalkylene naphthalate resin composition having improved properties such as high impact resistance, chemical resistances and heat distortion temperature and also nacreous color and luster and a marble-like appearance.

Specifically, the invention relates to a resin composition having a marble-like appearance, comprising 5 to 90 % by weight, preferably 5 to 45 % by weight, more preferably 20 to 40 % by weight, based on the weight of the composition, of an aromatic polycarbonate, and a polyalkylene naphthalate consisting of polytetramethylene-2,6-naphthalate and polyhexamethylene-2,6-naphthalate, or a mixture thereof.

Previously, shaped articles of thermoplastic resins have been given nacreous luster by adding a natural nacreous foil material such as fish skins or scales or a synthetic foil such as lead carbonate or bismuth trichloride. However, these additives have toxicity or are inferior in heat resistance, and have been found unsatisfactory for practical applications.

In order to remove these defects of resinous shaped articles having nacreous luster, attempts have been made in recent years to blend various resins. For example, Japanese Patent Publication No. 13384/68 discloses a method in which an acrylic resin is mixed with polycarbonate. Japanese Patent Publication No. 34907/71 discloses a method in which an acrylic resin is mixed with a polyamide and polystyrene. It is also disclosed in Japanese Patent Publication No. 38700/71 that an acrylic resin is mixed with an acrylonitrile/styrene copolymer and polystyrene.

Since these methods use acrylic resins as a base, it is impossible to avoid a reduction in impact resistance of the resulting composition. Furthermore, the composition is susceptible to attack by organic solvents in general use such as acetone, benzole or carbon tetrachloride, and its use is limited.

On the other hand, aromatic polycarbonates, for example a polycarbonate obtained by reaction of 2,2-bis-(4-hydroxyphenyl)-propane with phosgene, have high tensile strength, impact strength and heat distortion temperature and excellent dimensional stability, and find a wide range of applications such as films and injection molded articles. However, when this resin comes into contact with an organic solvent in general use such as acetone, heptane, benzene or methyl acetate, its surface becomes cloudy and swells, and cracks owing to the concentration of stress are prone to occur. The presence of the solvent especially promotes this tendency. If a thermoplastic resin having good chemical resistance such as polyethylene terephthalate is incorporated in an attempt to remedy this defect, the heat distortion temperature of the resultant resin composition becomes exceedingly lower than that of an aromatic polycarbonate.

Extensive studies have been made in order to provide a polyalkylene naphthalate resin composition having excellent nacreous color and luster and a marble-like appearance and improved chemical resistance and impact resistance over the resin composition having a nacreous luster consisting mainly of the acrylic resins and improved heat distortion temperature over the mixture of the aromatic polycarbonate and polyethylene terephthalate. As a result, it has been found that when polytetramethylene-2,6-naphthalate or polyhexamethylene-2,6-naphthalate is mixed with an aromatic polycarbonate, there can be obtained a resin composition having excellent nacreous color and luster and a marble-like appearance.

It has also been found that this composition retains these properties well and even after contact with alkalies, it does not lose its excellent color, luster and appearance. Also it has been discovered that the composition has an improved heat distortion temperature which is quite unexpected from the mixing of an aromatic polycarbonate with a polyalkylene naphthalate.

The above excellent nacreous color and luster and marble-like appearance are not possessed by any one of the aromatic polycarbonate resin, polytetramethylene-2,6-naphthalate or polyhexamethylene-2,6-naphthalate taken individually, and does not appear even in a mixture of the aromatic polycarbonate and polyethylene terephthalate. We have also discovered that these properties are lost when the aromatic polycarbonate, polytetramethylene-2,6-naphthalate and/or polyhexamethylene-2,6-naphthalate are reacted in the molten state under the reaction conditions required to form a copolymer.

Accordingly, an object of this invention is to provide a polyalkylene napthalate resin composition consisting of an aromatic polycarbonate and a specific polyalkylene naphthalate and having excellent nacreous color and luster and a marble-like appearance as well as improved properties such as excellent impact strength and chemical resistance and a high heat distortion temperature.

Many other objects of the invention along with its advantages will become apparent from the following description.

The aromatic polycarbonate used in this invention can be produced by the known phosgene method or ester-interchange method using a 4,4'-dihydroxydiaryl alkane, such as 2,2-bis-(4-hydroxyphenyl)-propane (or bisphenol A), as a main component of the dihydroxy component. Another component may be incorporated in an amount of up to 20 mol % based on the total dihydroxy component. Examples of the other component are aliphatic dihydroxy compounds such as 1,3-propanediol, 1,4-butanediol or p-xylene glycol, or aromatic dihydroxy compounds containing hereto atoms on the main chain such as 4,4'-dihydroxy diphenyl sulfoxide, 4,4'-dihydroxy diphenyl ether, or 4,4'-dihydroxy diphenyl sulfide. The use of aromatic polycarbonates having an average molecular weight of about 15,000 to 100,000 is preferred.

The polyalkylene naphthalate used in this invention is at least one member selected from the group consisting of polytetramethylene-2,6-naphthalate (abbreviated as PTN) and polyhexamethylene-2,6-naphthalate (abbreviated as PHN). The PTN and PHN used in this invention can be produced by known methods using a component selected from naphthalene-2,6-dicarboxylic acid and its ester-forming derivatives as a dicarboxylic acid component and a component selected from 1,4-butanediol, 1,6-hexanediol and their ester-forming derivatives as a glycol component. PTN as used herein may contain not more than 15 mol %, preferably not more than 10 mol %, of tetramethylene naphthalate units, and PHN as used herein may contain not more than 15 mol %, preferably not more than 10 mol %, of hexamethylene naphthalate units. Examples of other dicarboxylic acid components are naphthalenedicarboxylic acids (other than the 2,6-type), terephthalic acid, isophthalic acid, diphenylsulfonedicarboxylic acid, diphenyletherdicarboxylic acid, adipic acid, sebacic acid, and ester-forming derivatives of these. Examples of a glycol components are ethylene glycol, propylene glycol, trimethylene glycol, neopentylene glycol, 1,4-cyclohexanediol, 1,4-cyclohexane dimethanol, bisphenol A, polyoxyethylene glycol, or ester-forming derivatives of these.

Preferably, the PTN and PHN have a relative viscosity of at least 1.4. The relative viscosity is a value measured at 35°C. on a solution of 1.2 g of PTN or PHN in 100 ml. of ortho-chlorophenol.

The composition of this invention having a marble-like appearance can be produced by mixing 5 to 90 % by weight, based on the weight of the composition, of the aromatic polycarbonate with PTN and/or PHN. In order to impart other properties such as nacreous color and luster, chemical resistance, resistance to cracks, and impact strength, it is preferred that 5 to 45 % by weight, especially 20 to 40 % by weight, of the aromatic polycarbonate be mixed with PTN and/or PHN.

The mixing of these components may be performed by any known method by which substantial reaction does not occur between the two. For example, there can be employed a method wherein the aromatic polycarbonate is added during the polymerization reaction of forming PTN and/or PHN, a method wherein they are mixed in the molten state and the mixture is pelletized, or a method in which these are mixed at the time of injection molding. In the case of mixing in the molten state, the time of contact between the two is preferably not more than 30 minutes, more preferably not more than 20 minutes, especially preferably not more than 15 minutes. Usually, the mixing time is not more than 10 minutes.

The composition of this invention may contain various additives such as a light or heat stabilizer, pigment, dye, fire retardant, nucleating agent, mold releasing agent, or inorganic filler such as glass fibers.

The composition of this invention may be in the form of powder, chip, pellet, flake or the like for shaping. The composition may be formed into various shaped articles such as films, sheets, rods or pipes.

The following Examples illustrate the method of this invention in which the test methods and evaluation are as follows:

1. Nacreous color and luster and marble-like appearance (to be referred to simply as marble-like appearance):

A pellet of the resin composition was formed at 250°C. using an injection molding machine to produce a test piece. The test piece was evaluated by the naked eye according to the following scale of evaluation.

| | |
|---|---|
| Grade 1: | Both the nacreous color and luster are excellent, and the entire test piece shows a beautiful marble-like appearance. |
| Grade 2: | The nacreous color or luster is insufficient as compared with Grade 1, but the test piece shows the beautiful marble-like appearance as Grade 1. |
| Grade 3: | Both the nacreous color and luster are insufficient; there is a marble-like appearance but it is insufficient. |
| Grade 4: | Both nacreous color and luster are insufficient, and a marble-like appearance is not substantially observed. |
| Grade 5: | The nacreous color and luster and the marble-like appearance are not substantially observed. |

2. Property of retaining nacreous color and luster and a marble-like appearance (to be referred to simply as the property of retaining a marble-like appearance):

The test piece which has been subjected to the test (1) above was immersed for 5 minutes in trichloroethylene, washed with water, and air dried at room temperature. This test piece was evaluated on the same scale as indicated in (1) above, and the property of retaining a marble-like appearance was expressed on a scale of the following grades. Those evaluated as grades 4 and 5 were not subjected to this test.

| | |
|---|---|
| Grade 1: | The grade of test (1) was maintained. |
| Grade 2: | Somewhat reduced from the grade of test (1), but not by one grade lower. |
| Grade 3: | Reduced by one grade lower than the grade of test (1). |
| Grade 4: | Reduced by two grades lower than the grade of test (1). |
| Grade 5: | Reduced by more than two grades lower than the grade of test (1). |

3. Chemical resistance:

a. The flexural strength (kg/cm$^2$) was measured in the mixture of 95 wt. % carbon tetrachloride and 5 wt. % acetone at 25°C. in accordance with ASTM D-790.

b. The test piece (60 mm × 60 mm × 3 mm) was immersed in a 10 % by weight aqueous solution of sodium hydroxide for 15 hours at 100°C., and the weight retention (based on the weight before immersion) was measured.

4. Heat distortion temperature:

Measured in accordance with ASTM-D648.

The tables appearing later on show not only the distortion temperatures measured, but also the extent of deviation in °C. from a line showing the effect of adding the heat-distortion temperature of the aromatic polycarbonate to that of the polyalkylene naphthalate, as shown in FIG. 1. The minus symbol means that the heat-distortion temperature is lower than that shown by the line showing the addition effect, and the plus symbol means that the heat-distortion temperature is higher than that shown by the line. FIG. 1 shows an example of a mixture comprising an aromatic polycarbonate prepared from bisphenol A as a dihydroxy component. In the Figure, *a* shows the addition effect of PTN having a relative viscosity of 2.27, *b* shows the addition effect of PHN having a relative viscosity of 2.15, and *c* shows the addition effect of polyethylene terephthalate having a relative viscosity of 2.68. The lines *a*, *b* and *c* are straight lines obtained by connecting the heat distortion temperatures of the polymers used.

Examples 1 to 7 and Comparative Examples 1 to 9

Polytetramethylene-2,6-naphthalate (PTN) having a relative viscosity of 2.27 and polycarbonate (PANLITE L-1250, trademark of Teijin Kasei K.K., Japan) were mixed in the ratios shown in Table 1. The mixture was dried with hot air at 120°C. for 12 hours, and melt mixed in an extruder having a screw diameter of 30 mm to form a thread. The thread was cut into pellets, and again dried in hot air at 120°C. for 12 hours to form the composition of this invention in the form of pellets. The properties of the composition are shown in Table 1. For comparison, polyethylene terephthalate (PET) was used instead of PTN, and the results are also shown in Table 1. The results with other known resins having nacreous luster are also given.

In the table, the following abbreviations were used.

| | |
|---|---|
| PTN: | polytetramethylene-2,6-naphthalate |
| PHN: | polyhexamethylene-2,6-naphthalate |
| PET: | polyethylene terephthalate |
| PAC: | polyacrylate |
| PC: | polycarbonate |
| PAM: | polyamide (nylon 6) |
| PS: | polystyrene |
| ASR: | acrylonitrile/sytrene copolymer resin |

Examples 8 to 14 and Comparative Example 10

Examples 1 to 7 were repeated except that polyhexamethylene-2,6-naphthalate (relative viscosity 2.15) was used instead of PTN. The results obtained are shown in Table 2.

Examples 15 to 17

Example 1 was repeated except that PTN and/or PHN of various relative viscosities and various PCs were used as indicated in Table 3. The results are shown in Table 3.

Examples 18 to 20 and Comparative Examples 11 to 16

Resin compositions were prepared using PTN having a relative viscosity of 2.27, PHN having a relative viscosity of 2.30, PET having a relative viscosity of 2.6, and bisphenol A polycarbonate having an average molecular weight of 25,000. The chemical resistance (b) of the resulting resin compositions was measured, and the results obtained are shown in Table 4.

Table 1

| Examples and Comparative Examples | Resin Composition | | | Properties | | |
|---|---|---|---|---|---|---|
| | Component (wt. %) | Component (wt. %) | Marble-like appearance (grade) | Property of retaining the appearance (grade) | Chemical resistance (a) (kg/cm²) | Heat distortion temperature (°C) |
| Comparative Example 1 | PTN (100) | — | 5 | — | 760 | 78 |
| Comparative Example 2 | — | PC (100) | 5 | — | 92 | 138 |
| Example 1 | PTN (95) | PC (5) | 2 | 1 | 750 | 83 (+2) |
| Example 2 | PTN (90) | PC (10) | 2 | 1 | 710 | 90 (+6) |
| Example 3 | PTN (80) | PC (20) | 1 | 1 | 660 | 102 (+12) |
| Example 4 | PTN (70) | PC (30) | 1 | 2 | 630 | 106 (+10) |
| Example 5 | PTN (60) | PC (40) | 1 | 2 | 650 | 118 (+16) |
| Example 6 | PTN (35) | PC (65) | 2 | 3 | 520 | 130 (+13) |
| Example 7 | PTN (15) | PC (85) | 2 | 3 | 420 | 134 (+5) |
| Comparative Example 3 | PET (70) | PC (30) | 5 | — | 750 | 85 (−8.3)* |
| Comparative Example 4 | PAC (30) | PC (70) | 1 | 4 | 103 | 120 |
| Comparative Example 5 | (PAC (70) | PAM (30) | 2 | 4 | 420 | 73 |
| Comparative Example 6 | | PS (30) | 2 | 5 | 650 | 82 |
| Comparative Example 7 | | PC (30) | 3 | 4 | 115 | 92 |
| Comparative Example 8 | PAC (30) | ASR (70) | 3 | 5 | 180 | 87 |
| Comparative Example 9 | | PS (70) | 2 | 5 | 670 | 85 |

*The polyester is polyethylene terephthalate (given for comparison)

Table 2

| Examples or Comparative Example | Resin Composition | | | Properties | | |
|---|---|---|---|---|---|---|
| | Component (wt. %) | Component (wt. %) | Marble-like appearance (grade) | Property of retaining the appearance (grade) | Chemical resistance (a) (kg/cm²) | Heat distortion temperature (°C) |
| Comparative Example 10 | PHN (100) | — | 5 | — | 680 | 58 |
| Example 8 | PHN (95) | PC (5) | 2 | 1 | 650 | 62 (±0) |
| Example 9 | PHN (90) | PC (10) | 2 | 1 | 710 | 70 (+4) |
| Example 10 | PHN (80) | PC (20) | 1 | 1 | 620 | 84 (+10) |
| Example 11 | PHN (70) | PC (30) | 1 | 2 | 550 | 94 (+12) |
| Example 12 | PHN (60) | PC (40) | 1 | 2 | 540 | 103 (+13) |
| Example 13 | PHN (35) | PC (65) | 2 | 3 | 440 | 125 (+15) |
| Example 14 | PHN (15) | PC (85) | 2 | 3 | 320 | 131 (+5) |

Table 3

| Examples | Resin Composition | | | Properties | | | |
|---|---|---|---|---|---|---|---|
| | PTN Relative viscosity / wt.% | PHN Relative viscosity / wt.% | PC Average molecular weight / wt.% | Marble-like appearance (grade) | Property of retaining the appearance (grade) | Chemical resistance (kg/cm$^2$) | Heat distortion temperature (°C) |
| 15 | 2.07 / 40 | 2.56 / 40 | 25,000* / 20 | 1 | 1 | 630 | 93 |
| 16 | 1.69 / 60 | — | 29,000* / 40 | 1 | 2 | 610 | 121 |
| 17 | 2.27 / 70 | — | 18,000** / 30 | 1 | 1 | 670 | 113 |

*: 2,2-bis-(4-hydroxyphenyl)-propane polycarbonate
**: 1,1-bis-(4-hydroxyphenyl)-cyclohexane polycarbonate Table 4

| Examples and Comparative Examples | Resin Composition (%) | | | | Weight retention (%) in chemical resistance test (b) |
|---|---|---|---|---|---|
| | PTN | PHN | PET | PC | |
| Example 18 | 60 | — | — | 40 | 99.5 |
| Example 19 | 40 | — | — | 60 | 97.6 |
| Example 20 | — | 60 | — | 40 | 99.3 |
| Comparative Example 11 | 100 | — | — | — | 100 |
| Comparative Example 12 | — | 100 | — | — | 100 |
| Comparative Example 13 | — | — | 100 | — | 80.0 |
| Comparative Example 14 | — | — | — | 100 | 94.5 |
| Comparative Example 15 | — | — | 60 | 40 | 87.5 |
| Comparative Example 16 | — | — | 40 | 60 | 91.2 |

What we claim is:

1. A resin composition having a marble-like appearance, consisting essentially of the substantially unreacted mixture of from 5 to 90 % by weight, based on the weight of the composition, of an aromatic polycarbonate, and at least one polyalkylene naphthalate selected from the group consisting of polytetramethylene-2,6-naphthalate and polyhexamethylene-2,6-naphthalate.

2. The resin composition of claim 1 wherein the amount of said polycarbonate is 5 to 45 % by weight based on the weight of the composition.

3. The resin composition of claim 1 wherein said aromatic polycarbonate has an average molecular weight of 15,000 to 100,000.

4. The resin composition of claim 1 wherein said polyalkylene naphthalate has a relative viscosity, as measured at 35°C. using a solution of 1.2 g of polymer in 100 ml. of ortho-chlorophenol, of at least 1.4.

5. The resin composition of claim 1 wherein the amount of said polycarbonate is 20 to 40 % based on the weight of the composition.

6. The resin composition of claim 1 wherein the aromatic polycarbonate and polyalkylene naphthalate are physically mixed while in a molten state, but substantially unreacted, for not more than thirty minutes.

7. The resin composition of claim 1 wherein the aromatic polycarbonate is an ester-interchange reaction product of a 4,4'-dihydroxydiaryl alkane.

8. The resin composition of claim 1 wherein the amount of said polycarbonate is 20 to 40 % based on the weight of the composition, the polycarbonate is an ester-interchange reaction product of a 4,4'-dihydroxydiaryl alkane, and the polycarbonate and the polyalkylene naphthalate are physically mixed while in a molten state, but substantially unreacted, for not more than 10 minutes.

* * * * *